US006944772B2

(12) United States Patent
Dozortsev

(10) Patent No.: US 6,944,772 B2
(45) Date of Patent: Sep. 13, 2005

(54) SYSTEM AND METHOD OF ENFORCING EXECUTABLE CODE IDENTITY VERIFICATION OVER THE NETWORK

(76) Inventor: D'mitri Dozortsev, 27515 Cordoba Dr. #3310, Farmington Hills, MI (US) 48334

( * ) Notice: Subject to any disclaimer, the term of this patent is extended or adjusted under 35 U.S.C. 154(b) by 242 days.

(21) Appl. No.: 10/329,873

(22) Filed: Dec. 26, 2002

(65) Prior Publication Data

US 2003/0177394 A1 Sep. 18, 2003

Related U.S. Application Data

(60) Provisional application No. 60/344,613, filed on Dec. 26, 2001.

(51) Int. Cl.[7] .............................. H04L 9/00; H04L 9/32
(52) U.S. Cl. ...................... 713/200; 713/187; 713/188; 713/201
(58) Field of Search ................................. 713/200–201, 713/176, 180, 187–188; 709/203, 223–225, 200; 707/1, 10

(56) References Cited

U.S. PATENT DOCUMENTS

| | | | | |
|---|---|---|---|---|
| 5,440,723 A | * | 8/1995 | Arnold et al. ................. | 714/2 |
| 5,987,611 A | | 11/1999 | Freund ........................ | 713/201 |
| 6,085,224 A | | 7/2000 | Wagner ....................... | 709/203 |
| 6,105,027 A | | 8/2000 | Schneider et al. ............. | 707/9 |
| 6,111,571 A | | 8/2000 | Summers .................... | 345/329 |
| 6,134,664 A | | 10/2000 | Walker ....................... | 713/201 |
| 6,141,686 A | | 10/2000 | Jackowski et al. .......... | 709/224 |
| 6,141,755 A | | 10/2000 | Dowd et al. ................ | 713/200 |
| 6,148,336 A | | 11/2000 | Thomas et al. ............. | 709/224 |
| 6,182,231 B1 | | 1/2001 | Gilgen ........................ | 713/324 |
| H1944 H | | 2/2001 | Cheswick et al. .......... | 713/201 |
| 6,185,689 B1 | | 2/2001 | Todd, Sr. et al. ........... | 713/201 |
| 6,189,032 B1 | | 2/2001 | Susaki et al. ............... | 709/225 |
| 6,772,346 B1 | * | 8/2004 | Chess et al. ................ | 713/201 |

* cited by examiner

*Primary Examiner*—Hosuk Song
(74) *Attorney, Agent, or Firm*—Gifford, Krass, Groh, Sprinkle, Anderson & Citkowski, P.C.

(57) ABSTRACT

A method and system for identity verification of executable code includes a central computer that is in communication with a computer network. The central computer includes a database that is adapted to store and analyze a plurality of executable code signatures, including signatures of malicious, legitimate, those executable codes identity of which is being investigated and those that have not been received for an investigation. The client computer has monitoring software that is adapted to monitor potentially dangerous events, such as an attempt to send or receive data over the network, receiving an e-mail, creation of a new process and likes. Any executable code on the client's computer in the current system is assumed to be potentially dangerous unless its identity and intent has been determined. In operation, unique signatures that relate to potentially dangerous executable codes are received by the central computer. Upon receipt, the unique signatures are compared with the plurality of executable code signatures in the database. Any executable code signatures of which are not already in the database are forwarded to the central computer for investigation. Once a determination is made regarding the status of the unique executable code (i.e., is it legitimate or malicious) the central computer transmits a command regarding the disposition of the respective executable code.

41 Claims, 2 Drawing Sheets

Fig. 2.

Monitoring application on a client computer receives from the server a list of signatures of modules (files) previously executed on this computer and identities of which have been previously verified 100

↓

List of signatures is stored in a local database 110

↓

Monitoring application on a client computer detects an event 120

↓

Pinpoint the module responsible for the event 130

↓

Create a signature of the module 140

↓

Comparison: is the signature in a local database? 150 —————————————→ YES

↓ NO

The signature is forwarded to the central computer 165

↓

Comparison: is the signature in the central database?

↓ NO           ↓ YES

The signature is added to the central database, flagged as: new, the file is not received 66

↓ Is the signature flagged: "new, file is not received"? 52 | Is the signature flagged: "received, under investigation"? 54 | Is the signature flagged: "legitimate"? 158 | Is the signature flagged: "malicious"? 162

The Module (file) itself is forwarded from the client computer to the central computer 68

↓

The signature is flagged, received, under investigation 70

↓

Message the client computer: «The file is being investigated» 56

↓

Investigation is complete. The file is determined to be: 72

↓                    ↓
Legitimate 74        Malicious 76

↓                    ↓
The signature is flagged: «Legitimate»    The signature is flagged: «Malicious»

60
Allow to work

164
Terminate

Send a respective message and command to the monitoring application on the client computer 180

SYSTEM AND METHOD OF ENFORCING EXECUTABLE CODE IDENTITY VERIFICATION OVER THE NETWORK

RELATED APPLICATION

This application claims priority of U.S. Provisional Patent Application Ser. No. 60/344,613 filed Dec. 26, 2001, which is incorporated herein by reference.

BACKGROUND

1. Field of the Invention

The present invention relates to a computer security system. More particularly, the invention concerns a real-time security system for monitoring and verifying identities of executable computer code.

2. Reference to Related Art

There exists a rapidly increasing need to protect personal computers in a network against attack/infection by malicious executable code. This is true for both businesses and individuals. All PCs connected through networks, be it LAN or WAN, "always on" Internet connections (e.g., cable modem, digital subscriber line (DSL) access and wireless access) or a dial up are potentially vulnerable. In the absence of protection, personal computers routinely face exploitation, information theft and data loss.

An executable code is usually contained within an executable files of an application (*.exe, *.dll, *.vxd, *.com, Java applets etc), although can also be contained within a data stream without identifiable file of origin. It is important to note that unless the user's personal computer runs an application with coding errors making it vulnerable for exploitation, or a gross error in configuration of the operating system, in order for a hacker to get unauthorized access to the computer he must deliver a malicious executable code to the user's PC and this code must be executed. This delivery and execution can, for example, be accomplished through the transmission of a malicious executable code attached to an e-mail. Another method of delivery requires downloading of a malicious code disguised as a legitimate executable code within a file. Additionally, a malicious code may be transferred via removable media (i.e., disk or CD). Malicious executable code can also be delivered within network's data stream without placing on a target computer a discrete malicious application.

Personal computer security comes down to knowing the identities of executable code running on a PC or in other words to executable code control. The essence of the executable code control mechanism of any security software is identity verification of executable code running on the user's computer. For maximum security, the identity of all executable code must be verified and deemed "good" or "bad" and no executable code should remain "unknown".

The simplest example of executable code control is our decision about installation and running a program based on the information we can collect about the program from various media.

Currently, there are also several major groups of software providing one or another level of executable code identity verification: 1) antivirus programs, 2) personal firewalls, 3) authenticity certificates, and 4) positive identity verification systems with centralized consoles for enforcing application control over the network.

Executable code control software or a part of it must be installed on the end-user's PC. Regardless of the type of the executable code control mechanism used, all executable code control software must discriminate between benign and malicious executable code. This discrimination may be accomplished by matching certain characteristics (file name, file size, file checksum, patterns of behavior, etc.) of a potentially dangerous executable code against a database of known malicious executable code. Typically, the database is maintained on the end-user's PC and must be either manually or automatically intermittently updated by the user or, particularly in positive identity verification systems by an administrator. Also, as is the case with electronic signatures, the signature's authenticity can be verified.

Antivirus programs use a presumption-of-innocence approach toward an executable code: "an executable code is considered to be safe, unless proven to be malicious". An antivirus program has a database of electronic signatures (fingerprints) of known malicious executable code. Each executable code on a local computer is matched against each entry in a local database. The matching process may also include heuristic analysis and the analysis of patterns of behavior. If a match is found, an antivirus program will prevent the code in question from being executed.

The weakness of all antivirus software is that it only recognizes those malicious executable codes that are a part of its database. Any executable code that is not in the database will be considered to be "good", be it malicious or not. It is not uncommon that hundreds of thousands of users are affected before a new malicious executable code becomes known to antivirus experts, added to the database and downloaded to users' computers. Also, each user must maintain on his/her computer the entire database containing hundreds of thousands of signatures or more, even though throughout the PC's lifetime fewer than ten signatures will be actually utilized. Transfer of databases to millions of users consumes vast resources in terms of traffic and time. In addition, there is a significant lag between the identification of a new malicious executable code and the distribution of a corresponding database update to the public. During this lag, it is very likely that the new malicious executable code will cause significant damage. Well-known examples of this phenomenon are the well-reported "Melissa" and "I Love You" programs that wreaked havoc before any effective antivirus software was available to the public. Indeed, it is current practice that whenever information regarding a new malicious executable code becomes available, that information must be downloaded and incorporated in a database on each PC. Updating such a database takes time, resources and often annoys the user. Also, an antivirus program has a relatively high response threshold. Typically, malicious executable code should cause some "symptoms" and exist in multiple copies in order to be detected. If a malicious executable code is not a virus, but a Trojan horse, that has no "symptoms", was created for a specific attack, and exists in a very small number of copies, chances are that an antivirus company will never find it.

Personal firewalls approach executable codes control differently. They typically don't have a pre-configured local database and in theory may help the user to find a malicious executable codes that would not be known to an antivirus program, provided that the executable codes in question will be attempting to send or receive data over the network. Presently, there are several major commercial brands of firewalls for PCs (McAffee, Symantec, ZoneAlarm, etc.) and numerous smaller brands. The common feature of all these PC firewalls is the ability to intercept a request by an executable codes for sending/receiving data over the network. Any executable codes attempting to send or receive data over the network will initially be treated by a personal firewall as potentially dangerous. A firewall will typically report to the user the name of the application containing executable code trying to send or receive data and the path to the corresponding *.exe file. It will then wait for the user to determine/decide whether the executable codes is safe or not.

There are several problems with this approach to executable codes control. The most important problem is that the level of the user's expertise ultimately determines personal firewall effectiveness. Also, it is not reliable as a malicious executable codes may masquerade as a legitimate one, tricking the user into making a mistaken decision. Also, an increasing number of network enabled applications and the necessity to control those applications at the level of individual executable codes (*.dll, *.ocx, *vxd, etc.) brings the number of executable codes requiring identity verification up to hundreds. Not even an expert user, let alone an average user, is able to verify the identity (authenticate) of hundreds of ever-changing (due to updates) executable codes. As a result, personal firewalls typically limiting executable codes control to a to that of contained within *.exe files.

Unlike an antivirus program, positive identity enforcement systems treat any executable code that is not on the list of approved executable codes as "guilty", be it malicious or legitimate. Coupled with a centralized management console it may provide higher security than an antivirus program or a personal firewall. Through the central application enforcement console each PC is connected to the central server. An administrator at the central server creates a set of rules (the rules may include, for instance, unique signatures of allowed applications containing executable code) for each PC. The rules are then transferred to each PC and will govern its use including allowing only approved (allowed) executable code to perform certain actions, for instance send or receive data over the network. Because any executable code that is not pre-approved will be automatically prevented from working (whether it is new, unknown or known malicious or non-malicious), the system is provided with a high level of security regardless of the user's expertise.

The centralized application enforcement console has still several serious drawbacks. First, it makes it necessary to continuously transfer updates of signatures of allowed (pre-approved) executable code to all PCs. In a self-confined, restricted environment of a single enterprise, when the number of allowed executable code is small, it might be practical. However, when there is a need to pre-approve all existing executable code for opened network users (or LAN users who require significant freedom of choice of applications by the end-user), the centralized enforcement console becomes ineffectual. It would require continual transfer of an immense database containing signatures of legitimate executable code, identities of which have been verified. Also, existing central management consoles would usually only control executable code contained within *.exe files. This is because the console administrator would typically not be able to verify identities of hundreds of executable codes contained in other types of executable files on his/her own.

Digital certificates represent another attempt to help the user in verifying identities of executable code. Such a certificate can be purchased by a software manufacturer from several sources (Thawte, Verisign and others) and utilized to digitally sign the files containing executable code, so that the end user looking at the signature verification popup could decide whether he/she trusts the executable code to work. The certificates are not expensive, virtually impossible to crack or counterfeit, easy to use and they provide a certain level of assertion about an executable code identity. However, they have several critical shortcomings. Specifically, the certificate asserts the identity of the software manufacturer and not the identity (or intent) of the executable code. For instance, a company that manufactures spying software will have its executable files signed and technically they are legitimate, although their intent from the "victim's" point of view is clearly malicious. Also, the process of verification of software manufacturer's identity by certificate issuing agencies is relatively simple so that virtually any ill-intended person or a business can receive it and disappear having a certificate that is valid for several years. Also, the certificate is just a small file (or two files) that can be copied or stolen and then used with malicious intent, while the manufacturer can potentially be held liable. This is particularly true for large companies, which have a sizable staff turnover and multiple departments using the same certificate. As a result, according to our data, the percentage of digitally signed executable files is actually going down, from about 3% in 2001 to 2.4% in 2002.

The most significant problem with all of the above-described solutions is that they either ineffective, impractical, offer protection only against known malicious executable code or are dependent on and limited by user's expertise. Therefore, the existing executable code control software may miss a new malicious executable code often just a simple variation of the old executable code. Therefore, there is a need for an effective, real-time system/method of protecting computer systems against known and unknown malicious executable code that does not require the user to continually download updates from a remote database or does not depend on the user's expertise and has a very low response threshold.

BRIEF SUMMARY OF THE INVENTION

In essence this invention provides an event driven system and method where an application on the client computer is forced to prove its identity and intent at the level of executable code in order to be allowed to operate.

The system includes a central computer connected to a computer network and plurality of client computers that are connected to the said central computer through a computer network, forming what we call the Virtual Security Network (VSN). The central computer includes a database that is adapted to store and compares a plurality multitude of executable code signatures (MD5 or another mathematical algorithm) executed on the client computers. The client computer includes a monitoring software package that monitors potentially dangerous events illustratively including the arrival of an e-mail message, an attempt to send/receive data over the network, a change in the registry, a change of the boot record, deletion of a file or the like. The system is driven by events on the client computer, which means that no parts of the database are transferred to the client computer prior to operation. Instead, only signatures of modules operating on a given client computer are requested and transferred from the central computer to the local database of the monitoring software on the client computer as described further in the text.

Upon detection of the occurrence of a potentially dangerous event, the monitoring software pinpoints the executable code responsible for it. Once the executable code is pinpointed, the monitoring application creates a unique suspect signature (using MD5 or another algorithm) for that module or a corresponding file and then transmits the suspect signature to the central computer.

The suspect signature transmitted by the client computer is received by the central computer and compared against the plurality of executable code signatures in the database. If the suspect signature is not already stored in the database, the executable file itself is then forwarded for further investigation. The central computer also transmits an information message back to the client computer stating that the suspect executable code signature is undergoing investigation. The actual executable code in question is then investigated and is eventually categorized in the database as "good" or "malicious". The client computer at intervals prompts the central computer as to the status of the investigation.

If the suspect signature is already stored in the database, but it is flagged as being investigated, the database will reply to the client monitoring application that the executable code has already been received from another user and is currently being investigated. The client computer at intervals prompts the central computer as to the status of the investigation.

If the suspect signature matches the signature of the executable code which identity has already been verified, the database provides positive indication regarding the categorization of the suspect executable code signature.

If the suspect signature is related to a malicious executable code, the central computer transmits a message to the monitoring application on the client computer prompting the client monitor application to disable, delete or otherwise prevent the executable code from operating. If the suspect signature is related to a legitimate executable code, the central computer transmits a message to the client computer informing the user that the suspect signature is belong to legitimate executable code and is safe to use, and the monitor application allows the executable code to operate.

Moreover, the central computer may remember signatures of which executable code were matched for every given client computer in the system, building a profile of signatures for every computer in the VSN. This profile can be stored on the central computer and retrieved by the client computer at the beginning of each subsequent section. Consequently, the client computer can use this profile to check executable code locally and only connect to the client, before connecting to the central computer.

These main advantages of the system can be illustrated by the following example. Client 1 executes the code X attempting to send data over the network on 2:25:02 p.m. The monitoring application on the client's computer detects an event and forwards the signature of executable code X to the central computer. The signature doesn't match any entries in the database, it is added to the database and flagged "new unknown, executable code is not received". Executable code X itself is now being uploaded from client 1 to the central computer for investigation. Creating a signature and matching it against the central database takes about one-quarter of a second. Client 2 executes the same code on 2:25:02 p.m. The monitoring application on the client's computer detects an event and forwards the signature of executable code X to the central computer. Now it will match an entry in the database that is flagged "new, unknown, executable code is not received". Client 2 will receive the following warning "The executable code you are attempting to execute is potentially dangerous. It has also been received by other users and is currently being investigated." The system will not attempt to upload executable code X from client 2, because it is already forwarding the same file from client 1. However, if client 1 refuses to forward executable code X to the central server, or its upload was interrupted, the system will attempt to upload executable code X or parts thereof from client 2. Each subsequent VSN user who attempts to execute the same executable code will receive the same message until the executable code has been received, investigated and categorized. Once the identity and intent of executable code X is determined, only those users who have executed or will execute executable code X will be notified accordingly and the system will command the monitoring applications of those exposed clients to act accordingly: terminate or allow to work etc.

This example illustrates the main advantages of the system illustratively including: the system automates the discovery and submission of potentially dangerous executable code; no expertise is required to use the present invention; each executable code only once need be submitted for investigation; it detects "unknown" potentially dangerous programs; it has the lowest possible response threshold of a single unknown potentially dangerous executable code on a single user's PC; it provides real- or near real-time warning for other exposed users; it is event driven with only those users who are exposed to a specific event using the database; and no parts of the database have to be downloaded to the end-user in advance of the event.

The current version of the present invention (pcInternet Patrol) identifies a previously undetected "Trojan horse" file in approximately one out of every 400 client computers monitored.

BRIEF DESCRIPTION OF THE DRAWINGS

A better understanding of the present invention will be had upon reference to the accompanying drawings, wherein like reference numerals refer to like parts throughout and wherein:

FIG. 2 is a diagram of the method of monitoring and analyzing executable code in accordance with the present invention of FIG. 1 in subsequent working sessions.

DETAILED DESCRIPTION OF THE PREFERRED EMBODIMENTS

Figure 1:
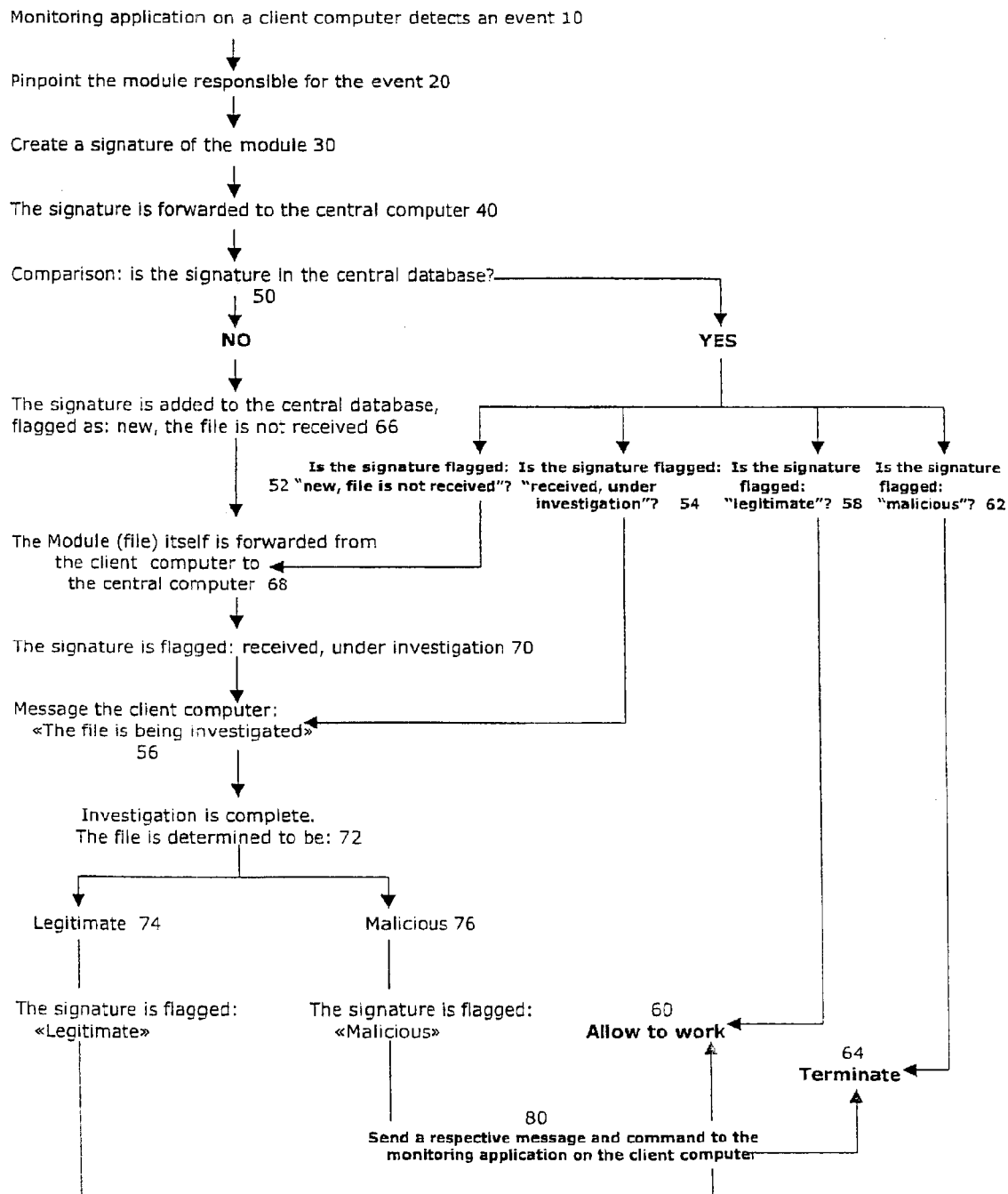
FIG. 1 is a diagram of the method of monitoring and analyzing executable code in accordance with the present invention during a first working session.

The present invention has utility as a computer executable code authentication, identity and intent verification system. The present invention delivers several advantages over existing systems in being more effective in uncovering new malicious programs without and, upon detection of a new malicious program, all users become immediately and simultaneously protected against the same threat regardless of their expertise and without the need to have their local database updated.

Referring now to FIGS. 1 and 2, there is shown a system of monitoring and analyzing computer executable code. The system includes a central computer connected to a computer network (e.g., a wide area network (WAN) such as the Internet or a local area network (LAN)) and at least one client computer that is connected to the central computer through the computer network. The client computer is preferably a personal computer (PC) workstation. However, other types of electronic devices capable of receiving and transmitting data over a computer network may also be used including a laptop computer, a palm or a handheld electronic device. The central computer includes a database that is adapted to store and compare a plurality of executable code signatures. The client computer includes a software package that monitors for potentially dangerous events on the client's computer illustratively including the arrival of an e-mail message, an attempt to send/receive data over the network, a change in the registry, a change of the boot record, deletion of a file, appearance of a new thread, changes in the protocol stack, creation of a socket or the like on the client computer and then finds a module and its corresponding file initiating or participating in the event. The monitoring application is also adapted to prevent a potentially dangerous event from proceeding, unless it receives a relevant command from the central computer or the user. The monitoring application is also adapted to temporarily or permanently prevent the executable code initiating or participating in the event from being executed.

It must be appreciated that the first working session on the client computer is different from the second and subsequent sessions. This difference is relevant to the present invention and is one of the important characteristics of the system.

The first working session of the present invention is shown in FIG. 1. Once the monitoring software package detects an event 10 it will attempt to pinpoint executable code responsible or associated with the event 20. Such potentially dangerous executable code include those having an *.exe extension, as well as those having a *.dll extension along with *.ocx, *.vxd and any other executable code. Those executable codes can also be represented by Java applets and other similar applications. Preferably, monitoring software detects an event at the moment of its initiation and from that moment to the end of the identity verification process monitoring software prevents the event from proceeding. It must be appreciated that some events may involve more than one executable code. In such cases the process described below is repeated for each suspect executable code separately or simultaneously. If a suspect executable code has been successfully pinpointed, the monitoring application will create a suspect executable code signature 30 (using MD5 or another algorithm) and then forward that suspect signature to the central computer 40 for analysis. The first step of analysis of the suspect signature includes comparison of the suspect signature with the plurality of signatures stored in the database 50. If signatures match an entry in the database, subsequent steps will depend on how the signature is flagged. It must be appreciated that the types and the number of flags in the current invention can be more than those described here. If the signature is flagged: "new, file is not received" 52, the system will attempt to download the actual suspect executable code from the client computer to the central server. If the signature is flagged "received, under investigation", the message reading, "The executable code is being investigated" 54 is forwarded to the client computer 56. If the signature is flagged "legitimate" 58, a corresponding message is sent to the client computer and the monitoring software on the client computer is commanded to allow the code in question to be executed and/or an event to proceed 60. If the signature is flagged "malicious" 62, the monitoring application receives a command to terminate the event 64. Event termination can be accomplished by terminating the process, but it can also be accomplished by a variety of temporary or permanent means. The system can also be configured to allow the end-user to override the system's decision, for instance to allow a "malicious" executable code to operate.

If the signature doesn't match any entries in the database, the signature is then added to the database and flagged "new, executable code is not received" 66. Then, the system will attempt to forward the suspect executable code for further investigation, and if forwarding the executable code is successful and the executable code is received 68, its signature in the database is then flagged "The executable code is being investigated" 70 and the system sends a corresponding message to the client computer. If the system fails to forward the executable code from the client computer, it will try to receive it again from the same client computer or another client computer which has the same executable code, until the executable code is received.

Once the executable code is received, it is investigated. While an executable code is being investigated it may be allowed to operate or be prevented from operating dependent on the client's monitoring software and the system as a whole configuration.

Also, while the executable code is being investigated, the client monitoring software will request the central computer through predetermined time intervals to provide the status of the investigation.

File investigation may include in-house analysis of the executable code, called functions, executing the code in a sandbox environment, etc. It may also include executable code identity verification by a presumed manufacturer, authenticity certificate authorities and other entities.

Once the executable code investigation has been completed 72, it is categorized and its signature in the database is flagged "legitimate" 74 or "malicious" 76. The system may include more than two types of flags. For instance, an FTP server may be flagged "legitimate, potentially dangerous". In addition, the administrator may add a description of the file to help the user make his/her own decision.

If the signature is flagged "legitimate" 74, a corresponding message is sent to the client computer and the monitoring software on the client computer is commanded to allow the code in question to be executed and/or an event to proceed 80. If the signature is flagged "malicious" 76, the monitoring application receives a command to terminate the event 64. Event termination can be accomplished by terminating the process, but it can also be accomplished by a variety of temporary or permanent means. The system can also be configured to allow end user to override the system's decision, for instance to allow a "malicious" executable code to operate.

Preferably, the central computer stores a history of the logs previous user sessions of the client computer and therefore it knows which executable codes identities were verified during previous sessions for each client computer. Because the central computer may store a history of each client computer usage, the second working session of a given client computer and every subsequent session will differ from the first session as detailed in FIG. 2.

The system of FIG. 2 can be configured in such way that at the beginning of a new working session the client computer is able to retrieve the signatures of those executable codes which identities were previously verified for the given client 100 and to store them in the local database of the monitoring software on the client computer 110. Preferably, the signatures are not written to the hard drive, but instead only stored in the random access memory or another memory device that only exists while the computer is powered. Preferably the local database is encrypted. Once the monitoring software package detects an event it will attempt to pinpoint an executable code responsible or associated with the event. Such potentially dangerous executable code may be contained in files including those having an *.exe extension, as well as those having a *.dll extension along with *.ocx, *.vxd extensions and any other files that contain executable code or that can generate executable code. Those executable codes can also be represented by Java applets and similar applications. Preferably, the monitoring software detects an event 120 at the moment of its initiation and from that moment to the end of the identity verification process monitoring software prevents the event from proceeding. It must be appreciated that some events may involve more than one executable code. In such cases the process described below is repeated for each suspect executable code separately or simultaneously. If the suspect executable code has been successfully pinpointed 130, the monitoring application will create a suspect executable code signature 140 (using MD5 or another algorithm) and then compare the suspect executable code signature with entries in the local database of the monitoring application on the client computer 150. If the signature matches an entry in the database, the system DOES NOT proceed to forward the signature to the central computer. If the signature in the local database is flagged "legitimate" 158, a corresponding message is sent to the client computer and the monitoring software on the client computer is commanded to allow the code in question to be executed and/or an event to proceed 180. If the signature in the local database is flagged "malicious" 162, the monitoring application receives a command to terminate the event 164. Event termination can be accomplished by terminating the process, but it can also be accomplished by a variety of temporary or permanent means. The system can also be configured to allow the end-user to override the system's decision, for instance to allow a "malicious" executable code to operate.

If the signature doesn't match an entry in the local database, it is then forwarded for comparison to the central computer 165 and subsequent events are then identical to those described above with respect to the first working session with like numerals denoting like steps of FIG. 1. The analysis of the suspect signature includes comparison of the suspect signature with the plurality of signatures stored in the database. If signatures match an entry in the database, subsequent steps will depend on how the signature is flagged. It must be appreciated that the types and the number of flags in the current invention can be more than described here. If the signature is flagged "new, executable code is not received" 52, the system will attempt to download the actual suspect executable code from the client computer to the central server. If the signature is flagged "received, under investigation" 54, the following message is forwarded to the client computer, "The executable code is being investigated" 56. If the signature is flagged "legitimate" 58, a corresponding message is sent to the client computer and the monitoring software on the client computer is commanded to allow the executable code in question to be executed and/or an event to proceed 60. If the signature is flagged "malicious" 62, the monitoring application receives a command to terminate the event 64. Event termination can be accomplished by terminating the process, but it can also be accomplished by a variety of temporary or permanent means. The system can also be configured to allow the end user to override the system's decision, for instance to allow a "malicious" executable code to operate.

If the signature doesn't match any entries in the database, the signature is then added to the database and flagged "new, executable code is not received" 66. Then, the system will attempt to forward the suspect executable code for investigation, and if forwarding the executable code is successful and the executable code is received 68, its signature in the database is then flagged "The file is being investigated" 70 and the system sends a respective message to the client computer. If the system fails to forward the executable code from the client computer, it will try to receive it again from the same client computer or another client computer which has the same executable code, until the executable code has been received.

Once the file has been received, it is investigated. While the executable code is being investigated it may be allowed to operate or be prevented from operating dependent on the client's monitoring software and the system as a whole configuration.

Also, while the executable code is being investigated, the client monitoring software will request the central computer through predetermined time intervals to provide the status of the investigation.

File investigation may include in-house analysis of the executable code, called functions, executing the code in a sandbox environment, etc. It may also include executable code identity verification by a presumed manufacturer, authenticity certificate authorities and other entities.

Once the file investigation has been completed 72, it is categorized and its signature in the database is flagged as "legitimate" 74 or "malicious" 76. The system may include more than two types of flags. For instance, an FTP server may be flagged "legitimate, potentially dangerous". In addition, the administrator may add a description of the executable code to help the user in making his/her own decision.

If the signature is flagged "legitimate" 74, a corresponding message is sent to the client computer and the monitoring software on the client computer is commanded to allow the code in question to be executed and/or an event to proceed 180. If the signature is flagged "malicious" 76, the monitoring application receives a command 180 to terminate the event 164. Event termination can be accomplished by terminating the process, but it can also be accomplished by a variety of temporary or permanent means. The system can also be configured to allow the end user to override the system's decision, for instance to allow a "malicious" executable code to operate.

Through discrete time intervals, the client computer may connect to the central computer in order to synchronize the status of executable code in the local database with their status in the centralized database. Therefore if the status of any executable code has changed (i.e. an unknown executable code has become known as malicious or an executable code previously mistakenly identified as good in course of further investigation has turned out to be malicious) the client computer receives a executable code status update in real- or near real-time. Optionally, since the central computer retains a memory of executable code on the client computer, the central computer notifies the client computer of vulnerability in the version of the executable code operating and the necessity of an upgrade or some other fix. The central computer in this way communicates to the client computer the experience of other client computers connected to the central computer with respect to the versions of executable code being used by the client computer.

It is appreciated that some executable code are of dual-use nature. For instance, a file transfer protocol (ftp) program which is a legitimate program can also be used by a computer hacker as a method of gaining access to the client's computer content. Therefore, each executable code along with the status "legitimate" or "malicious" also has the administrator's description to guide the user regarding its disposition.

It will be appreciated that the system of the present invention requires no part of the database of the central computer to be transmitted or otherwise downloaded to the client computer in advance of a possible exposure to a malicious program. Furthermore, it will be appreciated that in the present invention the client computer may store signatures of only those codes that have been executed on the client computer. Furthermore, it will be appreciated that the system allows to determine not only the identity, but also the intent of the executable code. Furthermore, it will be appreciated that the system provides positive identity verification for all executable code, legitimate and malicious, thus protecting users from the latest malicious applications. Further, it will be appreciated that the threshold for triggering investigation is a single unknown executable code on a single computer. Furthermore, it will be appreciated that while the system has been described as being used in connection with application identification, it may also be used to monitor and control mass e-mail broadcasts.

Having thus described my invention, various embodiments will become apparent to those having skill in the art that do not depart from the scope of the present invention.

What is claimed is:

1. A process for monitoring and analyzing executable computer code comprising the steps of:

providing a client computer having an event monitoring application in a working session, said client computer accessing a central computer through a computer network, said central computer having a database comprising a plurality of executable code identity signatures;

detecting an event on a client computer by said monitoring application;

identifying an executable code associated with an event;

creating a unique signature of a said executable code with said monitoring application on said client computer;

receiving in said central computer said unique signature;

comparing said unique signature with said plurality of executable code identity signatures in said database;

forwarding to said central computer for investigation said executable code when said unique signature is absent from plurality of executable code identity signatures;

investigating the identity and intent of said executable code if said executable code is unknown; and transmitting from the said central computer to said client computer at least one item selected from the group consisting of: a message and a command to the monitoring application on a said client computer to perform a respective action.

2. The process of claim 1, wherein said computer network comprises a wide area network.

3. The process of claim 1, wherein said computer network comprises a local area network.

4. The process of claim 1, further comprising a client computer in communication with said central computer through said computer network.

5. The process of claim 1, wherein central computer receives for an investigation a file containing said executable code or participating in generation of said executable code.

6. The process of claim 1 wherein said monitoring application is adapted to identify said executable code in a stream of data being received/sent over the network.

7. The process of claim 1 wherein said monitoring application is also a firewall.

8. The process of claim 1 wherein said monitoring application is also an antivirus.

9. The process of claim 1, wherein said executable code is disabled during investigation.

10. The process of claim 1, wherein said executable code is allowed to operate during investigation.

11. The process of claim 9 wherein the user of the client computer overrides the disablement of said executable code.

12. The process of claim 1 further comprising the step of storing within said database usage history data of said client computer.

13. The process of claim 12 wherein usage history data comprises signatures of executable code previously found on said client computer and previously verified signatures.

14. The process of claim 1 wherein said message transmitted is a warning when said unique signature matches a dangerous member of said plurality of executable code identity signatures.

15. The process of claim 1, further comprising the step of adding said unique signature to said plurality of executable code identity signatures.

16. The process of claim 1, wherein each signature of said plurality of executable code signatures in said database is comprised of: signatures related to legitimate executable code, signatures related to malicious executable code, signatures related to potentially dangerous executable code, signatures related to executable codes identities and intent of which are being investigated and signatures relating to mass mailing executable code.

17. The process of claim 1 wherein a second executable code is active in said event.

18. The process of claim 1 wherein a said respective action is termination of the process corresponding to the said event.

19. The process of claim 1 wherein a said respective action is a termination of a thread.

20. The process of claim 1 wherein a respective action is removing said executable code active with said event.

21. The process of claim 1 wherein investigation of said executable code comprises the step of analyzing said executable code with a presumed manufacturer protocol.

22. A process for monitoring and analyzing executable computer code comprising the steps of:

providing a client computer having an event monitoring application in a working session, said client computer accessing a central computer through the computer network, said central computer having a database comprising a plurality of executable code identity signatures;

detecting an event on a client computer by said monitoring application;

identifying an executable code associated with an event;

creating a unique signature of a said executable code with said monitoring application on said client computer;

receiving in said central computer said unique signature;

comparing said unique signature with said plurality of executable code identity signatures in said database;

forwarding to said central computer for investigation said executable code when said unique signature is absent from plurality of executable code identity signatures;

transmitting from the said central computer to said client computer at least one item selected from the group consisting of: a message, a command to the monitoring application on said client computer to perform a respective action, and usage history data of said client computer prior to the working session, wherein said usage history data is stored in a local database; and storing within said database usage history data of said client computer, wherein said client computer receives from the central computer said usage history data prior to the working session and said usage history data is stored in a local database.

23. The process of claim 22, wherein said local database is preferably stored in random access memory.

24. The process of claim 22 wherein said unique signature of said executable code is compared to said usage history data in the said local database.

25. The process of claim 24 wherein a match between said unique signature and a datum within said usage history data precludes forwarding of said unique signature to said central computer.

26. The process of claim 22 further comprising the step of comparing of a status of usage history data signature within said local database is with a central database status for said usage history data signature.

27. The process of claim 26 wherein said central database status controls relative to said status of usage history data signature within said local database.

28. The process of claim 26 wherein said status of usage history data signature within said local database controls relative to said central database status.

29. A process for monitoring and analyzing executable computer code comprising the steps of:
   providing a client computer having an event monitoring application in a working session, said client computer accessing a central computer through the computer network, said central computer having a database comprising a plurality of executable code identity signatures;
   detecting an event on a client computer by said monitoring application;
   identifying both an executable code and a second executable code associated with an event;
   creating a unique signature of at least one of said executable code and said second executable code with said monitoring application on said client computer;
   receiving in said central computer said unique signature;
   comparing said unique signature with said plurality of executable code identity signatures in said database;
   forwarding to said central computer for investigation at least one of said executable code and said second executable code when said unique signature is absent from plurality of executable code identity signatures; and
   transmitting from the said central computer to said client computer at least one item selected from the group consisting of: a message and a command to the monitoring application on a said client computer to perform a respective action;
   wherein a second executable code is active in said event; and
   wherein said executable code and second executable code are simultaneously identified.

30. A process for monitoring and analyzing computer executable code comprising the steps of:
   providing a client computer having an event monitoring application in a working session, said client computer accessing a central computer through the computer network, said central computer having a database comprising a plurality of executable code identity signatures;
   detecting an event on a client computer by said monitoring application;
   identifying an executable code associated with an event;
   creating a unique signature of a said executable code with said monitoring application on said client computer;
   receiving in said central computer a unique signature associated with an executable code;
   comparing said unique signature with said plurality of executable code signatures in said database;
   matching said unique signature to a malicious executable computer file signature from said plurality of file signatures; and
   transmitting a message and command to monitoring application regarding said executable code.

31. The process of claim 30, wherein said computer network comprises a wide area network.

32. The process of claim 30, wherein said computer network comprises a local area network.

33. The process of claim 30, further comprising a client computer in communication with said central computer through said computer network.

34. The process of claim 30, wherein said client computer further comprises a monitoring application, said monitoring application being adapted to identify executable code within a data stream received over the network.

35. The process of claim 30 further comprising the step of noticing a second client computer having a usage history datum within said database corresponding to said suspect signature matched said malicious executable computer code signature.

36. The system of claim 30 wherein each signature of said plurality of identity signatures in said database is selected from a group consisting of: signatures related to legitimate executable code, signatures related to malicious executable code, signatures related to potentially dangerous executable code, and signatures relating to mass mailing executable code.

37. A process for monitoring and analyzing an executable code comprising the steps of:
   providing a client computer having an event monitoring application in a working session, said client computer accessing a central computer through the computer network, said central computer having a database comprising a plurality of executable code identity signatures;
   providing a client computer in communication with said central computer through said computer network;
   detecting an event on a client computer by said monitoring application;
   identifying an executable code associated with an event;
   creating a unique signature of a said executable code with said monitoring application on said client computer;
   receiving in said server a unique signature transmitted from said client computer;
   investigating said unique signature to determine if it is related to a malicious executable computer code; and
   transmitting from said central computer a message and a respective command concerning said unique signature to said client computer.

38. The process of claim 37, wherein said computer network comprises a wide area network.

39. The process of claim 37, wherein said computer network comprises a local area network.

40. The process of claim 37, further comprising a client computer in communication with said central computer through said computer network.

41. The process of claim 37, wherein said client computer further comprises a monitoring application, said monitoring application being adapted to identify and forward to the central computer a file containing said executable code or participating in creating said executable code.

* * * * *